United States Patent [19]

Mottine, Jr. et al.

[11] Patent Number: 5,326,638

[45] Date of Patent: Jul. 5, 1994

[54] TRANSMISSION MEDIA COVERED WITH LEAD-FREE STABILIZED POLYVINYL CHLORIDE SHEATH WITH SACRIFICIAL COMPONENT

[75] Inventors: John J. Mottine, Jr., Omaha, Nebr.; Lloyd Shepherd, Madison, N.J.

[73] Assignee: AT&T Bell Laboratories, Murray Hill, N.J.

[21] Appl. No.: 751,485

[22] Filed: Aug. 29, 1991

[51] Int. Cl.⁵ .......................... B32B 15/00; H01B 7/00
[52] U.S. Cl. ...................... 428/379; 428/372; 428/375; 428/383; 428/389; 428/424.6; 174/68.1; 174/110 R; 174/110 SR; 174/112
[58] Field of Search ............... 428/379, 372, 375, 383, 428/389, 424.6; 174/68.1, 110 R, 112, 110 SR

[56] References Cited

U.S. PATENT DOCUMENTS 4,154,892  5/1979  Glatti et al. ......................... 428/379
4,584,241  4/1986  Choi et al. ........................... 428/379

FOREIGN PATENT DOCUMENTS 0437886  12/1990  European Pat. Off. .

OTHER PUBLICATIONS

Modern Plastics, "Heat Stabilizers" With Cadmium and Lead Drawing Fire, Suppliers Seek Laternatives, Sep. 1990, pp. 92–99.

U.S. application Ser. No. 07/675,784 filed on Mar. 27, 1991 in the names of M. F. Marx, et al.

Primary Examiner—Patrick J. Ryan
Assistant Examiner—Richard C. Weisberger
Attorney, Agent, or Firm—Donald E. Hayes, Jr.

[57] ABSTRACT

A cable (20) which may be used for communications, for example, include transmission media (24-24), each having a plastic composition of matter disposed thereabout. The insulation (26) comprises a polyvinyl chloride composition which includes a lubricant and a lead-free stabilization system. The stabilization system includes a calcium-zinc constituent in combination with an antioxidant-metal deactivator complex which provides a sacrificial function to prevent the formation of calcium or zinc chloride which would affect adversely the electrical properties of the insulated conductor. A jacket (28) typically is disposed about a plurality of the transmission media and comprises a non-lead stabilized plastic composition of matter.

18 Claims, 1 Drawing Sheet

TRANSMISSION MEDIA COVERED WITH LEAD-FREE STABILIZED POLYVINYL CHLORIDE SHEATH WITH SACRIFICIAL COMPONENT

TECHNICAL FIELD

This invention relates to transmission media covered with a lead-free stabilized polyvinyl chloride composition of matter. More particularly, the invention relates to lead-free polyvinyl chloride compositions which include calcium-zinc stabilizers.

BACKGROUND OF THE INVENTION

Polyvinyl chloride (PVC) is used widely in consumer and industrial products. In the communications products industry, for example, PVC is used for conductor insulation and cable jackets. Becuase PVC is unstable when exposed to heat and light, stabilizing additives must be added to the PVC. Typically, lead-based stabilizers are employed as antidegradants in PVC compositions for wire and cable use. Generally, organic phthalate, stearate and inorganic sulfate, phosphite, or carbonate lead derivatives comprise about 2 to 5 weight percent of PVC compositions.

In practice, it has been found that these lead stabilizers confer both long term and process stability to the PVC materials. Additionally, the resulting PVC insulating and jacketing materials exhibit desirable electrical and mechanical properties.

Recently, however, there has been interest in replacing lead stabilizers in PVC lead compositions with alternative stabilizers. This interest is driven by concerns about the toxicity of the lead derivatives, the cost for disposal of hazardous plastic waste containing them, and the possibility of future legislation banning the use of lead and other heavy metals. See, for example "Heat Stabilizers: With Cadmium and Lead Drawing Fire, Suppliers Seek Alternatives", Modern Plastics, September 1990, pp. 92–99.

Although alternative stabilizer systems for PVC are known in the art, there are no reports of widely accepted alternatives to lead-based stabilizers for flexible wire and cable products, specifically, or for other applications in which the electrical properties of the PVC materials are of paramount importance. In these applications, lead-based stabilizers are the outstanding performers in conferring stability to the molecular structure of the PVC during processing. Major chemical alterations of the PVC structure, which adversely affect its electrical properties, are thereby prevented. Further, lead-based stabilizers and their reaction products with hydrogen chloride are nonconductive and are resistant to hydrolysis because of their low solubility in water. If they were otherwise, the electrical properties of the insulated conductor would be affected adversely.

In a recently developed non-lead stabilized PVC composition, lead stabilizing additives in PVC compositions for wire and cable were replaced with a synergistic mixture of oleic acid based ester lubricants in combination with a calcium-zinc composition, a tin composition or an admixture of the two metal compositions. Improvements to the foregoing were still sought after in order to improve further the electrical properties of the insulation and to reduce further the costs.

What is sought after and what seemingly is not available in the art are compositions of matter which may be used to cover transmission media such as insulation or jacketing, for example, and which include lead-free stabilizer systems that are reasonable in cost. Sought after as replacements for lead stabilizers are additives which are capable of being employed in PVC materials, and of exhibiting lower toxicity and adequate stability, and which are such that desirable electrical properties are achieved. Also, the reaction products of the sought after non-lead stabilization system should be substantially non-conductive before and after exposure to water.

SUMMARY OF THE INVENTION

The foregoing problems of the prior art have been overcome with the transmission media of this invention. Optical fiber or metallic conductors are covered at least substantially with a polyvinyl chloride composition of matter which includes a polyvinyl chloride base resin and a stabilizer system which does not include lead. Lead stabilizing additives have been replaced effectively in PVC formulations with a synergistic mixture of lubricants in combination with a calcium-zinc constituent, a constituent such as an antioxidant-metal deactivator which protects the PVC resin from oxygen-catalyzed expulsion of hydrogen chloride or an admixture of these compositions. The PVC compositions of the transmission media of this invention exhibit excellent processing characteristics and stability during extrusion as insulation onto metallic wire such as, for example, copper and/or as jacketing on a cable core as well as over coated optical fiber. Additionally, mechanical and electrical properties of the resulting PVC cable constructions are excellent in comparison with those obtained from test results on lead-stabilized materials, the present industry standard.

These results are surprising and have led to two conclusions regarding the synergism exhibited by the stabilizer compositions. First, the observation of desirable mechanical and electrical properties in the stabilized PVC compositions implies the absence of degraded PVC molecular structures and conductive metal salts such as, for example, $ZnCl_2$ or $CaCl_2$, formed by a reaction with hydrogen chloride. This conclusion mitigates concerns about the formation of water soluble metal salts upon processing which might leach out into water upon disposal of the PVC plastic material in landfills. Second, because the mechanism of stabilizer activity does not appear to involve, in major part, scavenging of hydrogen chloride released from degraded PVC compositions, it is believed that the stabilizer system of the transmission media of this invention operates by an unexpectedly powerful inhibitory action against the initiation of degradation reactions in the PVC material. It should be pointed out, however, that this result also may be rationalized as a consequence of reduced processing temperatures that are attainable because of the synergism between the lubricant portion and the stabilizer system of the inventive plastic coverings. At lower processing temperatures, thermal cleavage of the carbon-chloride bond in PVC with subsequent expulsion of hydrogen chloride may be reduced or eliminated.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
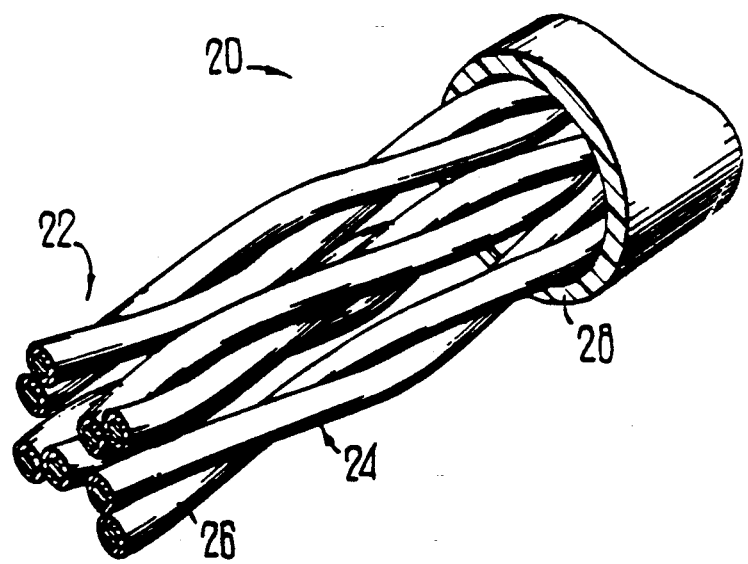
FIG. 1 is a perspective view of a communications cable which includes insulation and jacketing of this invention.
Figure 2:
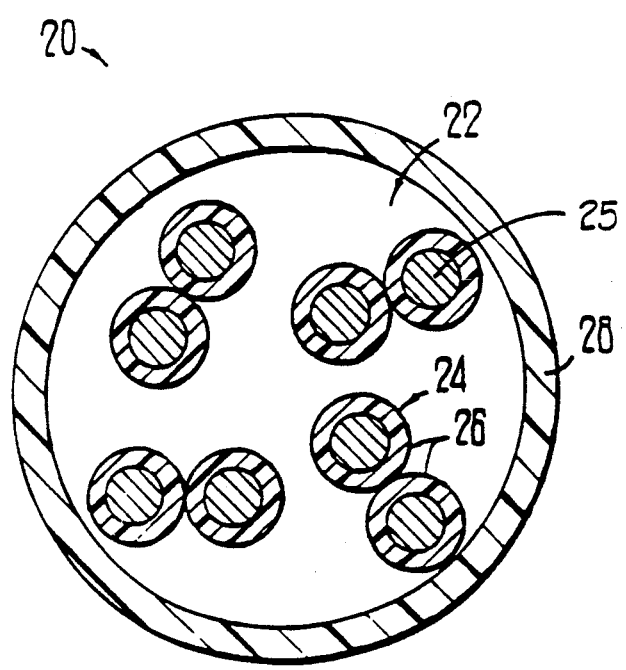
FIG. 2 is an end sectional view of the cable of FIG. 1 with spacing among pairs of transmission media being exaggerated.

Referring now to FIGS. 1 and 2 there is shown a communications cable which is designated generally by the numeral 20. The cable 20 includes a plurality of transmission media such as for example, a plurality of pairs 22—22 of insulated conductors 24—24. Each of the conductors 24—24 includes a metallic conductor 25 and a layer 26 of an insulation material disposed thereabout.

The insulation material of the layer 26 comprises a polyvinyl chloride (PVC) composition of matter. The PVC polymers useful in this invention include not only homopolymers of vinyl chloride but also copolymers containing up to 20 percent, preferably up to 10 percent, by weight of comonomers such as propylene and/or copolymers such as polyvinyl acetate. Polymer and resin are used synonymously for purposes of this disclosure. Where the PVC composition is to be used in transmission media, it is desirable in general that it have certain electrical characteristics. For typical applications, a PVC composition is chosen which falls within the GP4-00005 to GP7-00005 (inclusive) classification promulgated in A.S.T.M. Standard D1755-88 (Reapproved 1987).

Typically, pellets of the PVC composition are fed into an extruder (not shown). Therein, the pellets are heated and form a melt which is moved through the extruder barrel to a crosshead. A die in the crosshead is effective to cause extrudate comprising the PVC composition of matter to be applied to successive increments of length of a metallic conductor, for example, which are advanced through the crosshead.

As the PVC composition is moved through the extruder, it is subjected to relatively high temperatures. When subjected to such temperatures, the PVC composition tends to degrade. In order to obtain the advantageous properties of processing and long term stability while maintaining the other desirable attributes of the PVC composition, the composition must be provided with a suitable stabilizer system. Unless this system is carefully formulated, the PVC composition exhibits processing and stability difficulties. As mentioned hereinbefore, a suitable stabilizer system has included, in the past, a lead constituent.

The conventional lead stabilized PVC composition of the prior art has been replaced with a synergistic mixture of this invention comprising a base resin, a lubricant, a bimetallis calcium-zinc constituent and a sacrificial constituent such as an antioxidant-metal deactivator complex. By sacrificial is meant that the constituent protects the PVC resin from oxygen-catalyzed expulsion of hydrogen chloride. Included in the preferred composition is a PVC resin in an amount of 100 parts by weight of resin (PHR). The PVC resin is disclosed hereinbefore.

Calcium-zinc stabilizers are described by Marcel Dekker, Encyclopedia of PVC, 1, edited by L. I. Nass (1976), pages 311-313, and are typically in the form of the calcium or zinc stearate, although other salts such as those formed from benzoates and carboxylates, are useful. The PVC insulation composition is stabilized by a system which includes a calcium-zinc constituent in the range of about 2 to 10 PHR. If less than 2 PHR of the calcium-zinc constituent is used, then the stabilization system is not sufficiently effective. On the upper end of the range, more than 10 PHR unjustifiably increases the cost. In the preferred embodiment, the stabilization system comprises in the range of about 4 to 5 PHR of Therm-Chek 6164 W calcium-zinc stearate which is marketed by the Ferro Chemical Company.

Important considerations in formulating the calcium-zinc mixture are (1) the ratio between the calcium and zinc and (2) the percentage of calcium and zinc relative to the total weight of the PVC composition. The weight ratio between the calcium and the zinc present in the PVC composition is important with respect to dynamic heat, process and color stability. Typically, it is desirable for the total weight percent of calcium and zinc in the calcium-zinc mixture to be such that the PHR is in the range of about 2 to 10. Larger weight percentages generally cause plate-out of additives onto extruder surfaces, and with less, the PVC polymer becomes dynamically unstable, that is, the PVC polymer upon processing undergoes degradation. Typically, the heat stability should be greater than 15 minutes in a Brabender Plasti-Corder Torque Rheometer (oil heated) with a No. 5 roller head operating at 100 rpm rotor speed and 205° C. bowl temperature.

As will be recalled, prior art stabilization systems typically included lead which reacts to form lead chloride when the polymer is degraded. Lead chloride advantageously is non-conductive and non-hydrolytic, but disadvantageously is not biodegradable and has an undesirable toxicity attribute. Although the calcium-zinc, which is the most toxicologically safe PVC stabilizer constituent of the stabilizer system of the insulation composition of this invention, is biodegradable, it also is both hydrolyzable and conductive.

In order to protect the calcium-zinc constituent and to prevent the formation of calcium-zinc chloride during the extrusion process, a sacrificial constituent is included. The sacrificial constituent protects the material during compounding and extrusion and protects the calcium-zinc against the undesirable formation of calcium-zinc chloride.

Stabilizer compositions which include an antioxidant-metal deactivator complex have demonstrated satisfactory performance as such in the range of about 0.1 to 2.5 PHR for the antioxidant and 0.05 to 1.25 PHR for the metal deactivator. This combination is synergistic. In the preferred embodiment, 0.5 PHR of antioxidant and 0.25 PHR of the metal deactivator constituent are used in combination with the calcium-zinc constituent.

The use of the calcium-zinc stabilization system provides a surprising result. Typically, calcium-zinc stabilizers are not used as primary stabilizers in the manufacture of insulation products which have acceptable electrical characteristics. If oxidized, the polymer gives off acid which reacts with the calcium-zinc to produce, undesirably, calcium-zinc chloride. The result of excellent electrical properties in the insulation is surprising because of the otherwise expected formation of calcium-zinc chloride which would affect adversely the electrical properties of the insulation. Instead, the antixodant-metal deactivator is consumed by being oxidized in preference to the polymer.

The insulation composition of this invention includes a stabilization system comprising two constituents, whereas it has been typical in the art to use one or the other. The combination of the calcium-zinc and the antioxidant-metal deactivator constituents is sufficient to impart the desired thermal stability to the PVC composition. Long-term and processing stability, however, are not the only properties which must be controlled for effective use of a PVC composition. Typically, it is desirable that additives be introduced into the PVC to modify other characteristics. For example, it is desirable that the PVC composition be flame retardant, be amenable to expeditious processing, be stable in humid conditions, maintain heat and color stability over time, and possess desirable mechanical and electrical properties. Thus, polymers such as PVC must be blended not only with stabilizers but also with many additives to produce all of the desired properties. Each additional additive may substantially augment the price of the composition. Also, it is not uncommon for an additive to enhance one property but to degrade a second property or detract from the efficacy of other additives. The stabilizer system of the insulation composition of the transmission media of this invention is compatible with a wide range of aforementioned additives used in the PVC insulation composition.

Also included in the composition of the insulation is a lubricant system. The synergistic mixture of the preferred insulation composition of the transmission media of this invention includes oleic acid-based ester lubricants. A system which includes a complex ester of oleic acid and a diglycerol ester of oleic acid is preferred. The preferred lubricant system includes about 0.5 to 5 parts by weight of a diglycerol ester of oleic acid and about 0.3 to 3 parts by weight of a complex ester of oleic acid. More particularly, a lubricant system which includes about 2.5 PHR of LOXIOL ® G-16 internal lubricant and about 0.75 PHR of LOXIOL ® G-71 external lubricant provides suitable lubricity. The lubricant constituents are available from The Henkel Group of Dusseldorf, Germany. LOXIOL G-16 lubricant comprises a glycerol ester of unsaturated fatty acid whereas LOXIOL G-71 lubricant comprises a complex ester from unsaturated fatty acids.

A complex ester of oleic acid is an ester that could be formed by the hypothetical reaction of oleic acid with a branched chain alcohol. This definition does not preclude complex esters formed by a reaction other than alcohol-acid esterified or which cannot be formed by such reaction provided the ester can be postulated as the product of such a reaction. Typical advantageous complex esters of oleic acid contain 28 to 32 carbon atoms. Combinations of complex oleic acid esters are also useful. For example, a pentaerythritol-adipate-oleate, e.g., the aforementioned LOXIOL G-71 lubricant manufactured by Henkel, is quite useful. The complex ester of oleic acid should be utilized in a weight percentage of from about 0.2 to 2.0 percent of the PVC composition including additives which is equivalent to 0.3 to 3 PHR. Preferably, the complex ester of oleic acid is utilized in a weight percentage 0.5 to 0.75 of the total weight of the PVC polymer with its associated additives. If less than 0.2 percent is utilized, an excessive shear heat causes degradation of the PVC polymer. Typically, if greater than 2.0 percent of complex ester is utilized, excessive slippage in processing of the composition results. Slippage, in turn, causes surging of the composition through the processing equipment and irregularities in the product from flow instability. Additionally, for percentages higher than 2.0, additives tend to plate-out onto the surfaces of the compounding and processing equipment. This adversely affects the appearance and physical characteristics of the finished product.

The diglycerol ester or combination of esters of oleic acid used in conjunction with the complex ester(s) of oleic acid (LOXIOL G-71 lubricant) is preferably an ester having 14 to 18 carbon atoms, e.g., LOXIOL G-16 lubricant manufactured by Henkel, Inc.. The diglycerol ester, i.e., an ester of 2-3,bishydroxymethylbutane-1-2-3-4-tetrol, advantageously is utilized in a weight percentage to total weight of the PVC compound of from about 0.35 to 3.5 percent by weight, which is equivalent to about 0.5 to 5.0 PHR. Weight percentages below 0.35 percent lead to heat buildup in the PVC composition during processing with associated degradation of the PVC polymer. Weight percentages greater than 3.5 percent retard mixing and incorporation of additives into the PVC polymer material and causes excessive slippage resulting in flow instability during processing. Additionally, levels higher than 3.5 percent generally lead to plate-out during processing.

The composition of the insulation also includes other constituents to provide the composition with additional properties. Included is a plasticizer in the range of about 20 to 75 PHR. In the preferred embodiment are included 30 PHR of di-isodecyl phthalate (DIDP).

The insulation composition of this invention also includes constituents which provide flame and smoke suppression. A smoke suppressant is included in the range of about 0.5 to 10 PHR. In the preferred embodiment, 1 PHR of Ongard 2 smoke suppressant, which is marketed by Anzon, Inc., is included. Also, the insulation composition includes a flame retardant system constituent in the range of about 0.5 to 5 PHR with 1 PHR of antimony trioxide being present in the preferred embodiment.

Example compositions of insulation of this invention are disclosed in TABLE I as examples 1 to 5.

TABLE I

| | PVC COMPOSITIONS Example (PHR) | | | | | | | | | | | | |
|---|---|---|---|---|---|---|---|---|---|---|---|---|---|
| | Insulation Grade | | | | | | Jacket Grade | | | | | | |
| Constituent | Prior Art | No. 1 | No. 2 | No. 3 | No. 4 | No. 5 | No. 6 | No. 7 | No. 8 | No. 9 | No. 10 | No. 11 | No. 12 |
| Resin | 100 | 100 | 100 | 100 | 100 | 100 | 100 | 100 | 100 | 100 | 100 | 100 | 100 |
| Plasticizer DIDP | 30 | 30 | 30 | 30 | 30 | 30 | | | | | | | |
| Plasticizer Palatinol 711 | | | | | | | 40 | 40 | 40 | 40 | 40 | 40 | 40 |
| Flame Retardant Antimony Trioxide | 1 | 1 | 1 | 1 | 1 | 1 | 3 | 3 | 3 | 3 | 3 | 3 | 3 |
| Smoke Suppresant Ongard 2 | 1 | 1 | 1 | 1 | 1 | 1 | | | | | | | |
| Stabilizer Tribase | 7 | | | | | | | | | | | | |

TABLE I-continued

PVC COMPOSITIONS
Example (PHR)

| Constituent | Prior Art | Insulation Grade | | | | | Jacket Grade | | | | | |
| --- | --- | --- | --- | --- | --- | --- | --- | --- | --- | --- | --- | --- | --- |
| | | No. 1 | No. 2 | No. 3 | No. 4 | No. 5 | No. 6 | No. 7 | No. 8 | No. 9 | No. 10 | No. 11 | No. 12 |
| Lead Stabilizer Tribase XL | | | | | | | 5 | | | | | | |
| Stabilizer (calcium-zinc) Ferro 6164W | | 5 | 5 | 4 | 4 | 4 | | 5 | 5 | 5 | 4 | 4 | 4 |
| Flame Retardant Hydral 710 | | | | | | | 15 | 15 | 15 | 15 | 15 | 15 | 15 |
| Lubricant Rosswax 140 | 0.4 | | | | | | 0.5 | | | | | | |
| Internal Lubricant LOXIOL G-16 | | 1.5 | 1.5 | 1.5 | 1.5 | 2.5 | | 1.5 | 1.5 | 1.5 | 1.5 | 1.5 | 2.5 |
| External Lubricant LOXIOL G-71 | | 0.5 | 0.5 | 0.5 | 0.5 | 0.75 | | 0.5 | 0.5 | 0.5 | 0.5 | 0.5 | 0.75 |
| Leaded Lub-DS-207 Antioxidant | 0.4 | | | | | | | | | | | | |
| Irganox 1010 | | 0.5 | | | | | | 0.3 | | | | | |
| Mark 5111 | | | 0.5 | | | | | | 0.3 | | | | |
| Mark 158 | | | | 0.5 | 0.5 | | | | | 0.3 | | 0.3 | 0.3 |
| Metal Deactivator | | | | | | | | | | | | | |
| Irganox 1024 | | 0.25 | | | | | | 0.15 | | | | | |
| Mark DSTOP | | | | 0.25 | 0.25 | 0.25 | | | 0.15 | 0.15 | | 0.15 | 0.15 |
| TOTAL PHR | 139.8 | 139.75 | 139 | 138.75 | 138.75 | 140 | 163.5 | 165.45 | 165.45 | 165.45 | 164 | 164.45 | 165.70 |

Several stabilizers were evaluated in plastic compositions and compared to a composition which included a lead stabilizer. The results are reported in TABLE II. This initial analysis included those parameters, such as, for example, volume resistivity, dielectric constant and process stability, in which a non-lead stabilizer might have the highest potential to fail.

TABLE II
ELECTRICAL AND STABILITY PROPERTIES OF PVC MATERIALS

| Stabilizer Package (PHR) Insulation Grades | Volume Resistivity (ohm-Cm) Req. = >$10^{12}$ | Dielectric Constant Req. = <4.00 | Process Stability (min) Req. = >18 |
| --- | --- | --- | --- |
| A) Lead PVC (7 PHR Tribase + Synergists) | $2 \times 10^{14}$ | 3.5 | 34 |
| B) 5 PHR Barium-zinc + synergists (Lubricants) | $1 \times 10^{12}$ | 4.0 | 39 |
| C) 5 PHR Calcium-zinc + synergists (Lubricants) | $2.5 \times 10^{13}$ | 3.8 | 57 |
| D) 4 PHR Calcium-zinc + synergists (Lubricants) + antioxidant-metal deactivator | $1 \times 10^{14}$ | 3.3 | 63 |
| E) 5 PHR Calcium-zinc + synergists (Lubricants) + antioxidant-metal deactivator | $3 \times 10^{14}$ | 3.1 | 72 |
| F) 2 PHR Calcium-zinc + synergists (Lubricants) + antioxidant-metal deactivator | $5 \times 10^{12}$ | 4.0 | 21 |
| G) 10 PHR Calcium-zinc + synergists (Lubricants) + antioxidant-metal deactivator | $2 \times 10^{14}$ | 3.4 | 110 |

Referring now to TABLE III, there are shown electrical properties of conductors insulated with the presently used lead-stabilized insulation. Also shown in TABLE III are electrical properties for insulated conductors which include non-lead stabilized insulation, and more specifically, the calcium-zinc stabilized insulation described hereinbefore.

TABLE III
ELECTRICAL TEST RESULTS

| | | SEVEN CABLE SUMMARY WITH LEAD STABILIZATION SYSTEM | PVC WITH LEAD-FREE CALCIUM-ZINC STABILIZATION SYSTEM |
| --- | --- | --- | --- |
| Resistance (Ohms/1000 ft) | Avg. | 27.3 | 27.6 |
| | Max. | 27.9 | 27.8 |
| Capacitance (pF/foot) | Avg. | 17.7 | 18.8 |
| | Max. | 19.8 | 19.8 |
| Attenuation (dB/1000 feet) | | | |
| 0.5 MHz | Avg. | 4.86 | 5.06 |
| | Max. | 5.20 | 5.24 |
| 1.0 MHz | Avg. | 7.00 | 7.40 |
| | Max. | 7.56 | 7.52 |
| 10.0 MHz | Avg. | 25.85 | 26.91 |
| | Max. | 27.92 | 27.31 |
| 16.0 MHz | Avg. | 35.69 | 36.04 |
| | Max. | 38.03 | 36.82 |
| Impedance (Ohms) | | | |
| 1.0 MHz | Min. | 94 | 101 |
| | Max. | 100 | 104 |
| 10.0 | Min. | 90 | 97 |
| | Max. | 97 | 98 |
| Crosstalk in dB at 1 MHz | Worst | 41 | 48 |

The transmission media are disposed within a jacket 28. For the jacket of the cable of this invention, a plastic composition also is provided with a non-lead stabilizer. See examples 6 to 12 in TABLE I. As can be seen, the composition includes 100 PHR of PVC and a plasticizer in the amount of 40 PHR. In the preferred embodiment, the plasticizer is one designated Palatinol 711 and available from the BASF Company.

As in the insulation, the jacket composition also includes a flame retardant system. The preferred embodiment includes 3 PHR weight of antimony trioxide. Further included is a synergistic flame retardant in the range of about 5 to 50 PHR. In the preferred embodiment, 15 PHR of aluminum trihydrate such as HYDRAL 710 available from the Alcoa Company are included in the plastic composition of the jacket.

The jacket composition is stabilized with a non-lead stabilization system which includes a calcium-zinc constituent. The calcium-zinc constituent is included in the amount of about 2 to 10 PHR and preferably about 4 to 5 PHR. In the preferred embodiment, the Ferro 6164W is used as the calcium-zinc constituent. For the sacrificial constituent, an antioxidant-metal deactivator complex is used. In the jacket, the antioxidant may be included in the range of about 0 to 2.5 PHR whereas the metal deactivator may be included in the range of about 0 to 1.25 PHR.

Because of a primary one of the uses to which cable of this invention is to be put, it is important that the insulation and jacket of this invention meet requirements of Underwriters Laboratories Test UL 444. In Table IV hereinafter are set forth test properties and test results for a cable of this invention.

TABLE IV

PROPERTIES OF CABLES AND COMPONENTS THEREOF

| Component & Test Property | UL444 Requirement | Test Results (Pass/Fail) | |
|---|---|---|---|
| Copper Conductor: | | | |
| Diameter | Pars. 5.5–5.8 Tables 5.3, 5.4 | 19.22 | (Passed) |
| DC Resistance 20° C. | Pars. 15.1–15.9 Tables 15.1, 15.2 | 27.0 Ω/kft | (Passed) |
| Insulation: | | | |
| (T)ensile and (E)longation | Pars. 7.10–7.11 Tables 7.2–7.14 | Avg. T (psi) 3000 reqd. | Avg. E (%) 100 reqd. |
| Unaged/Aged | | Unaged: 4333 (Passed) | 250 (Passed) |
| | | Aged: 4630 (Passed) | 248 (Passed) |
| Crush | Pars 20.1–20.5 | 1042 Lbf | (Passed) |
| Flexibility: | Pars. 7.8–7.9 | | (Passed) |
| Shrinkback | Pars. 19.1–19.4 | 227 mils | (Passed) |
| Cold Bend | Pars 23.1–23.4 Table 23.1 | (Passed) | |
| Jacket: | | | |
| (T)ensile and (E)longation | Pars. 7.10–7.11 Tables 7.2–7.14 | 2000 reqd. Avg. T (Psi) | 100 reqd. Avg. E (%) |
| Aged/Unaged | | Unaged: 3231 (Passed) | 275 (Passed) |
| | | Aged: 3046 | 250 |
| Marking Durability | Pars. 31.1–31.5 | (Passed) | |
| Finished Cable Flexibility | Pars. 7.8–7.9 | Not Tested | |
| Insulation Resistance | Pars. 18.1–18.5 | 300 MΩ-1000 ft. reqd. 1775 MΩ-1000 ft. (Passed) | |
| Dielectric Withstand | Pars. 17.1–17.9 | (Passed) | |
| AC Leakage | Pars 17.10–17.12 | (Passed) | |
| Jacket Peel | Pars. 21.1–21.4 | Less Than 15 reqd. (Passed) | |
| Cold Bend | Pars. 24.1–24.3 | (Passed) | |

It is to be understood that the above-described arrangements are simply illustrative of the invention. Other arrangements may be devised by those skilled in the art which will embody the principles of the invention and fall within the spirit and scope thereof.

We claim:

1. A cable comprising:
   at least one longitudinally extending transmission medium;
   a lead-free polyvinyl chloride based material which surrounds at least a portion of said longitudinally extending transmission medium, said polyvinyl chloride based material being a composition comprising:
   a polyvinyl chloride resin;
   a stabilization system which comprises a calcium-zinc stabilizer and a sacrificial constituent which protects the polyvinyl chloride resin from oxygen-catalyzed expulsion of hydrogen chloride; and
   a lubricant; and
   a jacket which is comprised of a plastic material and which is disposed about said at least one transmission media.

2. The cable of claim 1, wherein said calcium-zinc constituent is included in said composition in the amount of about 2 to 10 parts by weight per 100 parts by weight of said polyvinyl chloride resin.

3. The cable of claim 1, wherein said constituent which protects the polyvinyl chloride resin from oxygen-catalyzed expulsion of hydrogen chloride comprises an antioxidant-metal deactivator synergistic complex.

4. The cable of claim 3, wherein the antioxidant and the metal deactivator constituents are included in said composition in the amounts of about 0.1 to 2.5 and 0.05 to 1.25 parts by weight, respectively, per 100 parts by weight of said polyvinyl chloride resin.

5. The cable of claim 1, wherein said composition also includes a lubricant system which includes oleic acid-based ester lubricants.

6. The cable of claim 5, wherein an internal lubricant constituent is included in said composition in the amount of about 0.5 to 5.0 parts by weight per 100 parts by weight of polyvinyl chloride.

7. The cable of claim 5, wherein an external lubricant constituent is included in said composition in the amount of about 0.3 to 3 parts by weight per 100 parts by weight of polyvinyl chloride.

8. The cable of claim 1, wherein said stabilization system is such that the resistance, the capacitance and the attenuation of cables which includes conductors insulated with said composition fall within acceptable ranges.

9. The cable of claim 1, wherein said plastic material of said jacket is a composition comprising a polyvinyl chloride resin and a stabilization system which comprises a calcium-zinc constituent and a sacrificial constituent which protects the polyvinyl chloride resin from oxygen-catalyzed expulsion of hydrogen chloride.

10. The cable of claim 9, wherein said sacrificial constituent said jacket composition comprises an antioxidant-metal deactivator synergestic complex.

11. The cable of claim 10, wherein the antioxidant and the metal deactivator of the plastic material of said jacket are included in said composition in the amount of about 0 to 2.5 and 0 to 1.25 parts by weight, respectively, per 100 parts by weight of said polyvinyl chloride resin.

12. The cable of claim 10, wherein said calcium-zinc constituent is included in said composition of said jacket in the amount of about 2 to 10 parts by weight per 100 parts by weight of said polyvinyl chloride resin.

13. An insulated transmission medium, said insulated transmission medium comprising
at least one longitudinally extending transmission medium; and
a polyvinyl chloride based material which surrounds at least a portion of said longitudinally extending transmission medium, said polyvinyl chloride based material being a composition comprising:
a polyvinyl chloride resin;
a stabilization system which comprises a calcium-zinc and a sacrificial constituent which protects the polyvinyl chloride resin from oxygen-catalyzed explusion of hydrogen chloride; and
a lubricant system.

14. The insulated transmission medium of claim 13, wherein said calcium-zinc constituent is included in said composition in the amount of about 2 to 10 parts by weight per 100 parts by weight of said polyvinyl chloride resin.

15. The insulated transmission medium of claim 13, wherein said sacrificial constituent comprises antioxidant and metal deactivator constituents which are included in said composition in the amount of about 0.1 to 2.5 and 0.05 to 1.25 parts by weight, respectively, per 100 parts by weight of said polyvinyl chloride resin.

16. The insulated transmission medium of claim 13, wherein said lubricant system includes an internal lubricant constituent and an external lubricant constituent.

17. The insulated transmission medium of claim 16, wherein said internal lubricant constituent is included in said composition in the amount of about 0.5 to 5.0 parts by weight per 100 parts by weight of polyvinyl chloride.

18. The insulated transmission medium of claim 16, wherein said external lubricant constituent is included in said composition in the amount of about 0.3 to 3 parts by weight per 100 parts by weight of polyvinyl chloride.

* * * * *